(12) United States Patent
Philipp et al.

(10) Patent No.: US 12,209,721 B1
(45) Date of Patent: Jan. 28, 2025

(54) SOLID STATE STEERABLE ILLUMINATION SYSTEM FOR VEHICLES

(71) Applicant: GM GLOBAL TECHNOLOGY OPERATIONS LLC, Detroit, MI (US)

(72) Inventors: Tzvi Philipp, Bet Shemesh (IL); Brenton John Sirowatka, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/492,286

(22) Filed: Oct. 23, 2023

(51) Int. Cl.
| F21S 41/135 | (2018.01) |
| B60Q 1/00 | (2006.01) |
| B60Q 3/10 | (2017.01) |
| B60Q 3/16 | (2017.01) |
| F21S 41/125 | (2018.01) |
| F21S 41/64 | (2018.01) |

(52) U.S. Cl.
CPC .......... *F21S 41/135* (2018.01); *B60Q 1/0094* (2013.01); *B60Q 3/10* (2017.02); *B60Q 3/16* (2017.02); *F21S 41/125* (2018.01); *F21S 41/645* (2018.01)

(58) Field of Classification Search
CPC .................................................... F21S 41/135
See application file for complete search history.

(56) References Cited

U.S. PATENT DOCUMENTS

| 11,447,063 | B2 | 9/2022 | Philipp et al. |
| 11,474,244 | B2 | 10/2022 | Philipp et al. |
| 2004/0080938 | A1 | 4/2004 | Holman et al. |
| 2012/0188467 | A1* | 7/2012 | Escuti ................ G02F 1/1347 349/1 |
| 2017/0270637 | A1* | 9/2017 | Perreault ............ G02B 27/0172 |
| 2020/0072950 | A1* | 3/2020 | Philipp ................ G01S 7/4817 |

FOREIGN PATENT DOCUMENTS

| CN | 107678040 A | 2/2018 |
| DE | 102020206537 A1 | 12/2021 |
| DE | 102021101790 A1 | 7/2022 |

OTHER PUBLICATIONS

German Office Action from counterpart DE1020231358804, dated Jul. 17, 2024.

* cited by examiner

Primary Examiner — Robert J May

(57) ABSTRACT

A solid state steerable illumination system for a vehicle includes a first light source configured to generate light having a first wavelength, a first liquid crystal polarized grating (LCPG) device arranged to receive light from the first light source, and a vehicle control module configured to supply drive voltages to the first light source and the first LCPG device to generate a beam of light, wherein an output orientation angle of the beam of light is variable according to drive voltage applied to the first LCPG device.

19 Claims, 5 Drawing Sheets

SOLID STATE STEERABLE ILLUMINATION SYSTEM FOR VEHICLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to solid state steerable illumination systems for vehicles, including multi-wavelength systems with multiple liquid crystal polarized grating (LCPG) devices.

Vehicle illumination, such as headlamps or interior lights, typically uses fixed light sources which transmit a beam of light in a fixed direction. Some vehicle illumination systems include mechanical components which physically move a light source or an optical device in order to change a direction of the beam of light.

SUMMARY

A solid state steerable illumination system for a vehicle includes a first light source configured to generate light having a first wavelength, a first liquid crystal polarized grating (LCPG) device arranged to receive light from the first light source, and a vehicle control module configured to supply drive voltages to the first light source and the first LCPG device to generate a beam of light, wherein an output orientation angle of the beam of light is variable according to drive voltage applied to the first LCPG device.

In other features, the system includes a second light source configured to generate light having a second wavelength, a third light source configured to generate light having a third wavelength, wherein the first wavelength, the second wavelength and the third wavelength are different, a second liquid crystal polarized grating (LCPG) device arranged to receive light from the second light source, a third liquid crystal polarized grating (LCPG) device arranged to receive light from the third light source, and a beam combiner configured to receive light output from the first LCPG device, light output from the second LCPG device, and light output from the third LCPG device, to define a combined beam of light, wherein the vehicle control module is configured to supply drive voltages to the second light source, the third light source, the second LCPG device and the third LCPG device, to generate the combined beam of light.

In other features, the vehicle control module is configured to obtain a target angular illumination location, determine drive voltages for the first LCPG device, the second LCPG device and the third LCPG device, corresponding to the target angular illumination location, and supply the determined drive voltages to the first LCPG device, the second LCPG device and the third LCPG device to orient the combined beam of light towards the target angular illumination location.

In other features, the target angular illumination location is a first target angular illumination location, and the vehicle control module is configured to obtain a second target angular illumination location, determine updated drive voltages for the first LCPG device, the second LCPG device and the third LCPG device, corresponding to the second target angular illumination location, and supply the updated drive voltages to the first LCPG device, the second LCPG device and the third LCPG device to steer the combined beam of light towards the second target angular illumination location.

In other features, suppling the updated drive voltages to the first LCPG device, the second LCPG device and the third LCPG device to steer the combined beam of light towards the second target angular illumination location includes changing an angular direction of the combined beam of light without mechanically moving the first light source, the second light source and the third light source, and without mechanically moving any optical device.

In other features, the vehicle control module is configured to identify a target object location using at least one front vehicle sensor of the vehicle, obtain a target angular illumination location according to the target object location, determine drive voltages for the first LCPG device, the second LCPG device and the third LCPG device, corresponding to the target angular illumination location, and supply the determined drive voltages to the first LCPG device, the second LCPG device and the third LCPG device to orient the combined beam of light towards the target object location.

In other features, the system includes a projection optic configured to modify an optical property of the combined beam of light, wherein the projection optic includes at least one of a diffuser and a shape silhouette outline.

In other features, the system includes a first collimation lens positioned between the first light source and the first LCPG device, a second collimation lens positioned between the second light source and the second LCPG device, and a third collimation lens positioned between the third light source and the third LCPG device.

In other features, the first wavelength corresponds to a visual red light color, the first wavelength corresponds to a visual blue light color, and the first wavelength corresponds to a visual green light color.

In other features, the system includes a vehicle headlamp, wherein the combined beam of light is transmitted as an output of the vehicle headlamp.

In other features, the system includes a vehicle interior light, a vehicle dashboard light or a vehicle exterior light, wherein the combined beam of light is transmitted as an output of the vehicle interior light, the vehicle dashboard light or the vehicle exterior light.

In other features, the first LCPG device includes at least two passive polarized grating layers each configured to modify an angular orientation of received light according to a level of voltage applied to the polarized grating layer.

In other features, the vehicle control module is configured to obtain a target light color value and a target light illumination value, determine light source drive voltages corresponding to the target light color value and the target light illumination value, and supply the determined light source drive voltages to the first light source, the second light source and the third light source, to generate the combined beam of light having the target light color value and the target light illumination value.

A method of controlling solid state steerable illumination for a vehicle includes supplying light source drive voltages to a first light source to generate light having a first wavelength, to a second light source configured to generate light having a second wavelength, and to a third light source configured to generate light having a third wavelength, wherein the first wavelength, the second wavelength and the third wavelength are different, and supplying liquid crystal polarized grating (LCPG) drive voltages to a first LCPG device arranged to receive light from the first light source, a second liquid crystal polarized grating (LCPG) device arranged to receive light from the second light source, and a third liquid crystal polarized grating (LCPG) device arranged to receive light from the third light source, wherein a beam combiner is configured to receive light output from the first LCPG device, light output from the second LCPG device, and light output from the third LCPG device, to define a combined beam of light.

In other features, the method includes obtaining a target angular illumination location, determining drive voltages for the first LCPG device, the second LCPG device and the third LCPG device, corresponding to the target angular illumination location, and supplying the determined drive voltages to the first LCPG device, the second LCPG device and the third LCPG device to orient the combined beam of light towards the target angular illumination location.

In other features, the target angular illumination location is a first target angular illumination location, and method further includes obtaining a second target angular illumination location, determining updated drive voltages for the first LCPG device, the second LCPG device and the third LCPG device, corresponding to the second target angular illumination location, and supplying the updated drive voltages to the first LCPG device, the second LCPG device and the third LCPG device to steer the combined beam of light towards the second target angular illumination location.

In other features, suppling the updated drive voltages to the first LCPG device, the second LCPG device and the third LCPG device to steer the combined beam of light towards the second target angular illumination location includes changing an angular direction of the combined beam of light without mechanically moving the first light source, the second light source and the third light source, and without mechanically moving any optical device.

In other features, the method includes identifying a target object location using at least one front vehicle sensor of the vehicle, obtaining a target angular illumination location according to the target object location, determining drive voltages for the first LCPG device, the second LCPG device and the third LCPG device, corresponding to the target angular illumination location, and supplying the determined drive voltages to the first LCPG device, the second LCPG device and the third LCPG device to orient the combined beam of light towards the target object location.

In other features, a projection optic is configured to modify an optical property of the combined beam of light, wherein the projection optic includes at least one of a diffuser and a shape silhouette outline.

In other features, a first collimation lens is positioned between the first light source and the first LCPG device, a second collimation lens is positioned between the second light source and the second LCPG device, and a third collimation lens is positioned between the third light source and the third LCPG device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some example embodiments described herein include a solid state based steering illumination system which may be used for adaptive vehicle illumination systems, e.g., headlamps, signaling, interior/exterior decorative illumination, etc. Other example applications include scenarios where the illumination can be adapted to sensory input which allows for steering the illumination beam to a selected region (e.g., a target object identified by a front vehicle object sensor). Multiple bandwidths of light (which may be narrow bandwidths and either visible or near infrared), may be used depending upon the application and the intensity of light desired. The discrete steering mechanism includes a liquid crystal polarized grating (LCPG) system that allows for discrete steering of the light beam via voltage control.

In some example embodiments, adaptable illumination allows for pattern projection on road surfaces for driver or pedestrian guidance, such as illuminating a cross walk, signaling, assistance and navigation. Any suitable light source may be used, including light emitting diodes (LEDs), Lasers, vertical-cavity surface-emitting lasers (VC SELs), SLEDs, etc.

LCPG devices may be used to steer beams of light in vertical directions, horizontal directions, or other desired directions, based on an orientation of layers of the LCPG devices (e.g., wherein multiple LCPG units scan in horizontal and vertical directions). LCPG devices may allow for lower temperature operations and sensitivity, longer mean time between failure (MTBF) due to solid state design, and may reduce or eliminate sensitivity to vibration for the steering mechanism (e.g., compared to mechanical systems which mechanically move a light source or an optical device).

Figure 1:
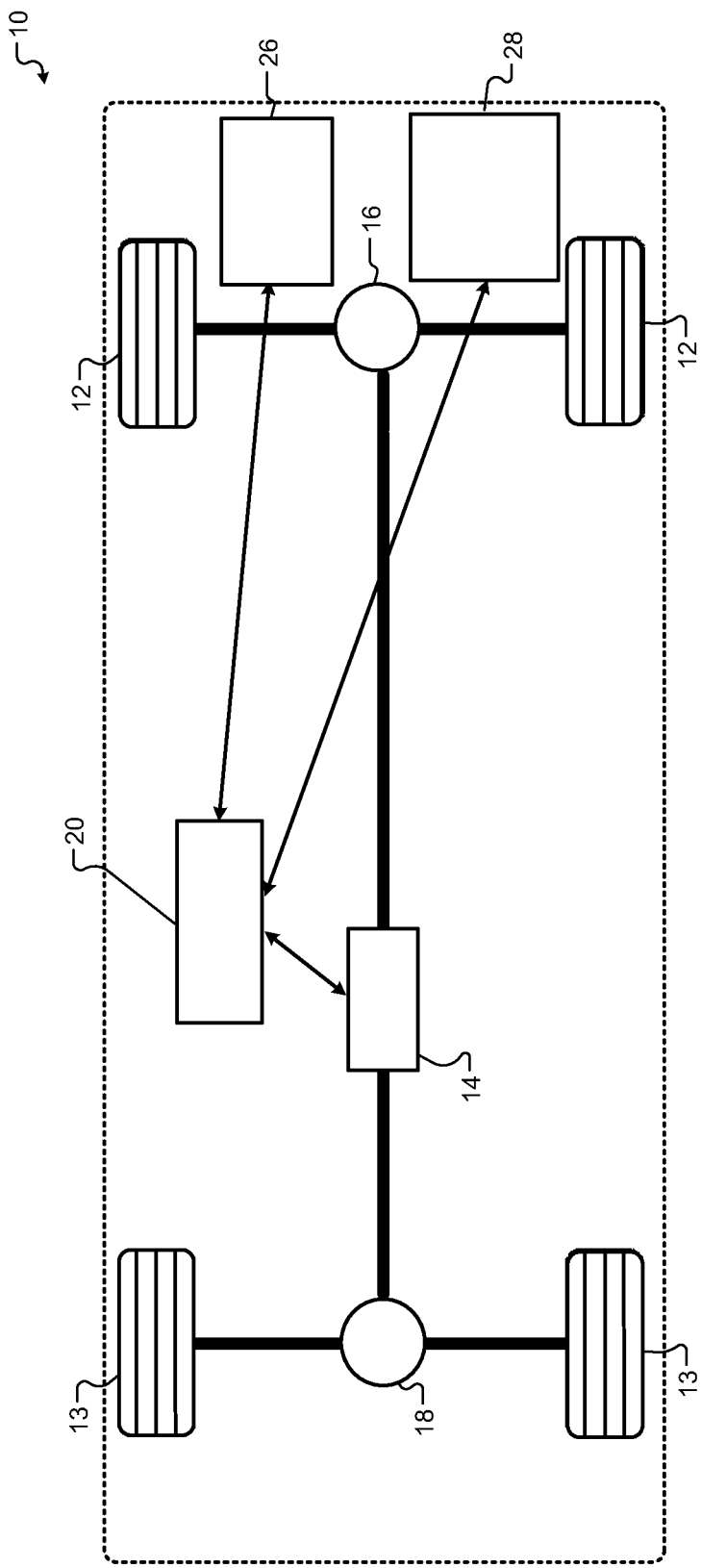
FIG. 1 is a diagram of an example vehicle including a solid state steerable illumination system.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration paddle, a vehicle camera, a braking system, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors (such as cameras, microphones, pressure sensors, wheel position sensors, brake sensors, location sensors such as global positioning system (GPS) antennas, etc.). Some sensors may be configured to monitor current motion of the vehicle, acceleration of the vehicle, braking of the vehicle, steering torque, etc.

As shown in FIG. 1, the vehicle 10 includes a front vehicle sensor 26, configured to detected objects in front of the vehicle 10. For example, the front vehicle sensor 26 may include one or more cameras, lasers, lidar systems, etc., configured to detect or identify objects in front of the vehicle, such as other target vehicles (e.g., closest in path vehicles).

In some example embodiments, the front vehicle sensor 26 may be used for automated driving control (e.g., of automated steering, braking, acceleration, etc.) to follow a closest in path (CIP) target vehicle. In various implementations, the vehicle 10 may include an optional rear vehicle camera, an optional side vehicle camera, etc. The vehicle control module 20 may be configured to control movement of the vehicle 10 based on tracked movement of the CIP vehicle, such as by increasing or decreasing automated acceleration of the vehicle 10 to keep up with the CIP vehicle, automatically applying brakes of the vehicle 10 when the CIP vehicle slows down, steering the vehicle 10 to follow a driving route of the CIP vehicle, etc.

The vehicle includes a solid state steerable illumination light 28. The solid state steerable illumination light 28 may include, for example, one or more head lamps or tail lamps of the vehicle 10, an interior light of the vehicle 10, a dashboard light of the vehicle 10, another light on an exterior of the vehicle, etc.

As explained further below, the solid state steerable illumination light 28 may include multiple light sources of different wavelengths, and multiple liquid crystal polarized grating (LCPG) devices which can change an angular direction of light according to a voltage applied to the LCPG devices. The vehicle control module 20 may be configured to selectively supply drive voltages to the LCPG devices of the solid state steerable illumination light 28, to steer an angular direction of light output from the solid state steerable illumination light 28.

For example, the vehicle control module 20 may be configured to angle a light output of the solid state steerable illumination light 28 in a direction that the vehicle 10 is currently turning. In some example embodiments, the vehicle control module 20 may identify a target object ahead the vehicle 10 using the front vehicle sensor 26, and control the solid state steerable illumination light 28 via voltages applied to the LCPG devices, to orient an angular direction of the light output from the solid state steerable illumination light 28 towards a location of the target object.

Due to the solid state steerable illumination light 28 controlling an angular direction of the light output based on voltages applied to the LCPG devices, the light may be steered without mechanical movement of any light sources and without mechanical movement of any optical devices.

The vehicle control module 20 may communicate with another device (such as another vehicle in the automated vehicle driving platoon) via a wireless communication interface, which may include one or more wireless antennas for transmitting and/or receiving wireless communication signals. For example, the wireless communication interface may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks. Regarding the vehicle-to-vehicle (V2V) communication, the vehicle 10 may include one or more V2X transceivers (e.g., V2X signal transmission and/or reception antennas).

The vehicle 10 also includes a user interface. The user interface may include any suitable displays (such as on a dashboard, a console, or elsewhere), a touchscreen or other input devices, speakers for generation of audio, etc.

In some examples, adaptive headlamp illumination may control the shape and location of the beam of light projected out to the environment, and may provide one or more of the following benefits. A solid state illumination steering system may increase safety by reducing or preventing direct illumination of the eyes of drivers in oncoming traffic. For example, the location of the oncoming drivers may be detected by viewing or perception cameras already mounted on the vehicle. By identifying the general location of where the driver is located within a bounding region of a detected vehicle, the coordinate information can be translated to the illumination system to avoid illuminating those regions. This may be achieved by avoiding steering the illumination beam to the identified driver region, or changing the shape of the illumination beam.

In some examples, the illumination beam may be steered towards the road surface in the shape of an arrow (or other suitable indicator) to inform the driver of where and in what direction to turn. Illuminating potentially dangerous objects located on the shoulders of the road may provide increased road shoulder safety, such as by steering the illumination beam to objects detected in the road shoulders like parked cars, animals or debris.

Example systems may provide more effective illumination by illuminating parts of the road more to one side or the other depending upon the direction of the vehicle relative to the road surface. For example, when the vehicle is approaching a curve in the road to the left or right, the illumination can steer to the direction of the curve in advance of the turn.

Some example embodiments may provide load compensation, by automatically leveling the illumination beam relative to the road surface by steering the beam to the road, which may occur independently of the weight load (e.g., trailering) of the vehicle. The technology may be applied to high beam or low beam illumination. Additional applications may use this architecture for signal lighting, interior lighting or outdoor night lighting, adaptable street lighting, parking lot lighting (e.g., guiding an individual to their vehicle), an exterior building, etc.

Figure 2:
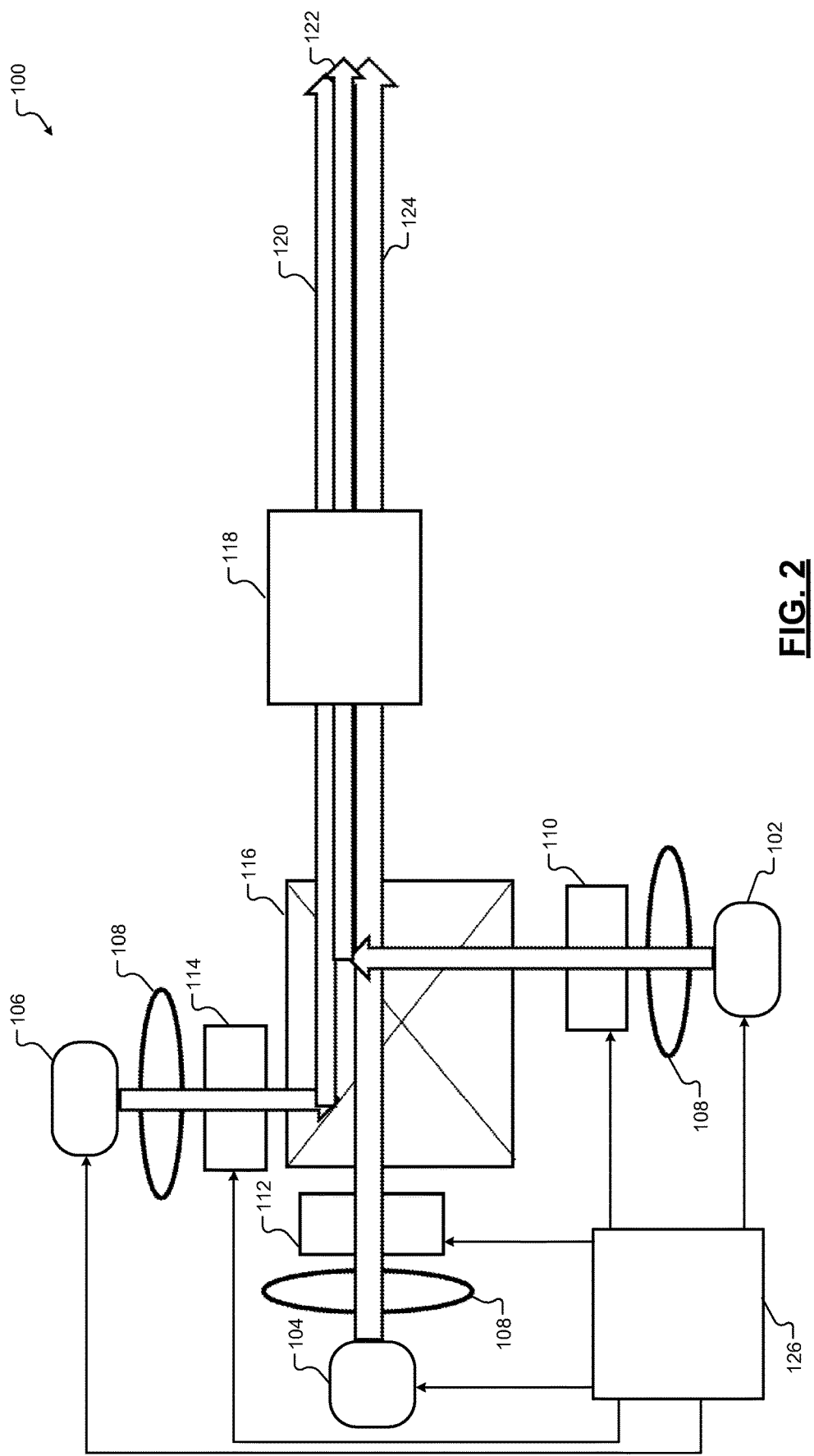
FIG. 2 is a block diagram of an example solid state steerable illumination system including multiple liquid crystal polarized grating (LCPG) devices.

FIG. 2 is a block diagram of an example solid state steerable illumination system 100 including multiple liquid crystal polarized grating (LCPG) devices. As shown in FIG. 2, the solid state steerable illumination system 100 includes a red light source 102, a green light source 104, and a blue light source 106.

Although red, green and blue light sources are illustrated in FIG. 2, other embodiments may have more or less light sources, light sources having other wavelengths, etc. Each light source may be configured to generate light having a specified polarization, such as right handed circular polarization (RCP) or left handed circular polarization (LCP).

A collimation lens 108 is positioned at the output of each light source, to focus the light in a specific direction. As shown in FIG. 2, the collimation lenses 108 direct the light from each source to a beam combiner 116. The beam combiner 116 may include any suitable arrangement of mirrors, reflective surfaces, coatings, transmissive surfaces, etc., which combine the light received from each source.

In the example of FIG. 2, the light from each light source arrives at the beam combiner 116 from a different direction, and the beam combiner 116 is configured to generate a combined light beam where a blue light beam 120, a red light beam 122 and a green light beam 124 are combined to form an output of the solid state steerable illumination system 100 (e.g., which may be a white light when the blue light beam 120, the red light beam 122 and the green light beam 124 are combined).

A first liquid crystal polarized grating (LCPG) device 110 is positioned between the red light source 102 and the beam combiner 116, a second LCPG device 112 is positioned between the green light source 104 and the beam combiner, and a third LCPG device 114 is positioned between the blue light source 106 and the beam combiner 116.

Each LCPG device is configured to selectively change an angular orientation of light passing through the LCPG device, based on a voltage supplied to the LCPG device. For example, each LCPG device may include one or more layers of, e.g., nematic liquid crystal (LC) film, with a continuous periodic pattern that may be classified as a polarization grating (PG). Other example materials for layer of an LC device may be polymerizable liquid crystals, known as reactive mesogen. In some implementations, the PG device may be created from linear photopolymerizable polymer (LLP) materials.

The structure of a layer of an LCPG device may include an in-plane, uniaxial birefringence that varies with position (e.g., $n(x)=[\sin(\pi*x/\lambda); \cos(\pi*x/\lambda); 0]$), where $\lambda$ is the grating period. Each LCPG device may be configured to efficiently diffract circularly polarized light in different angular directions, based on the polarization handedness of the input light and a voltage applied to the LCPG device.

Light sources with relatively narrow spectral bandwidths when combined can generate a wide variety of colors. For example, red, green and blue lights can be combined to generate many of the colors commonly detected by human perception, such as the RGB range in the CIE xy graph. Common sources used for RGB colors may be found in light emitting diodes (LEDs), Lasers, SLEDs (Super Luminescent Diodes) or VCSELs (Vertical Cavity Surface Emitting Lasers).

a narrow spectral band width, when combined with an LCPG device designed for a particular peak wavelength source, may be used to steer the beam projection angle. Combining multiple steerable light sources via an optical beam combiner can generate an illumination beam that has the combined light intensity and color of the three (or more or a smaller number of beams) to generate the desired color.

Since LCPG devices steer the beam of light by a combination of polarization orientation and wavelength, each light source may be polarized or have a polarizer added to the optical path between the light source and the initial LCPG element, to generate the initial linear polarization state.

LCPG elements may be built with multiple stages, where each stage has two steering angles. By combining multiple N stages, the overall steering range of the LCPG device is defined by $2^N$ number of unique angles. Some example embodiments may use three stages, although other embodiments may use more or less stages.

A specified design can be made of any of the suggested light sources or combinations thereof, such as three laser diodes of red, green and blue, or a green LED, a red laser and a blue VCSEL. The choice may be application dependent, cost or performance constrained, etc.

For each light source, a collimation lens may be used to collect the divergent light from the light source and form a predominantly collimated beam. With the light source generated, and the independent beams combined via a beam combiner element, the output beam may be transmitted through an optional diffuser element which acts to homologize the beam (e.g., angular or spatial).

The beam combiner may be an optical element formed from optical prisms. The prisms have transmissive/reflective coatings applied to the optical interfaces such that the optical performance in terms of reflection, transmission and sensitivity to angle of incidence at the coated surfaces matches the predominant wavelengths of light. The geometrical shapes of the prisms may facilitate an overall optical path of each wavelength of light being equivalent and uniform, to avoid introducing additional optical aberrations in the transmitted beam.

The beam may then pass through a beam limiting aperture that can be fixed in shape, or a spatial light modulator (e.g., reflective or transmissive) which can dynamically clip the beam edges into any desired shape (such as arrows, rectangles, etc.). After the aperture plane, a projection lens may be used to project out the illuminated shape generated in the aperture plane, to the environment viewed by the driver. Each LCPG unit and light source may be designed and manufactured to generate a desired diffractive beam steered angle, where calibration is used to fine tune the voltage values of the liquid crystal to optimize the polarization of the light to match the grating efficiency maximum.

For example, the drive voltage control module 126 (which may be a part of the vehicle control module 20), is configured to supply drive voltages to the first LCPG device 110, the second LCPG device 112, and the third LCPG device 114. The drive voltages may be selected based on a desired angle of steering of the light beams from each light source.

Figure 3:
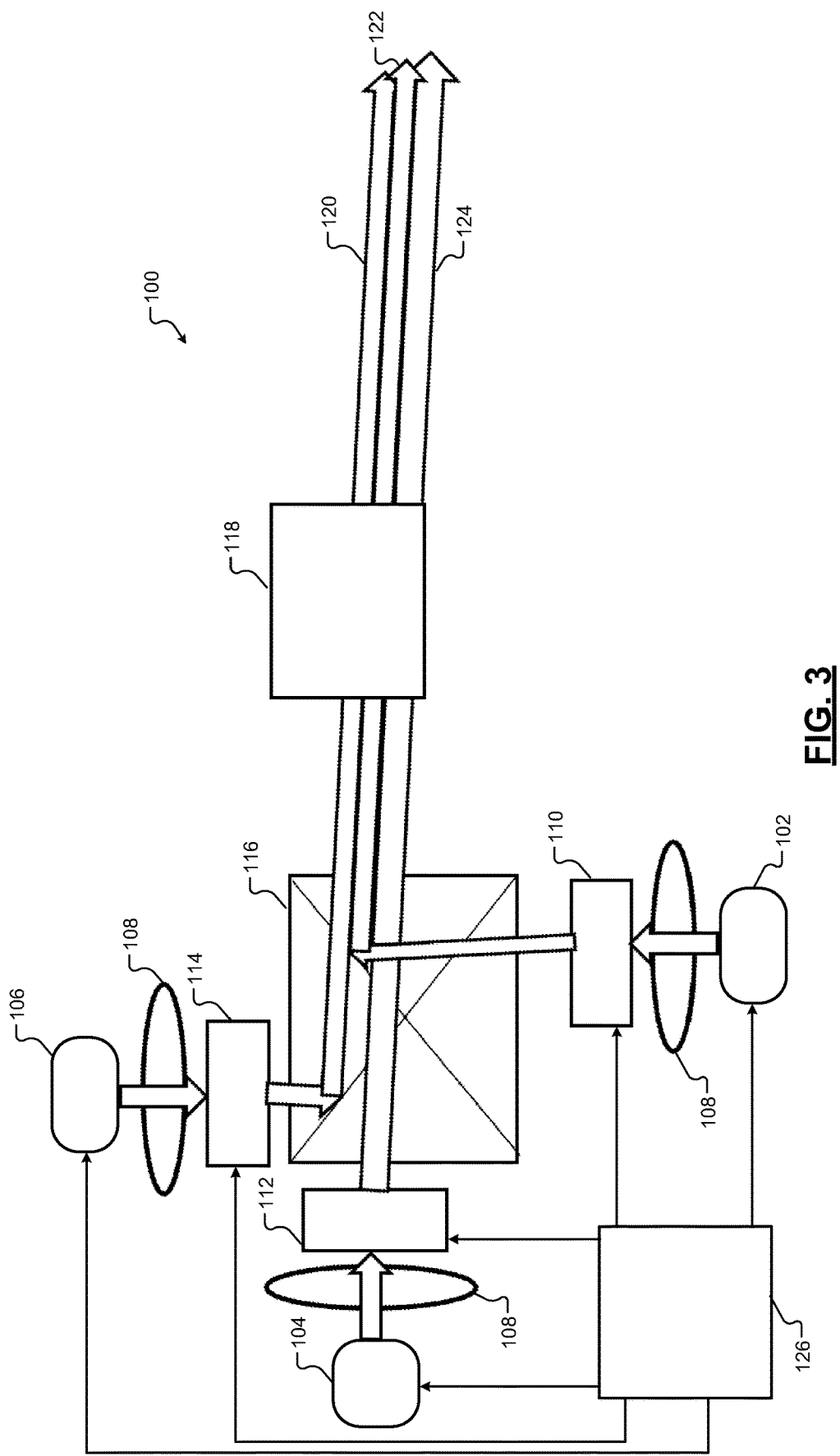
FIG. 3 is a block diagram illustrating the solid state steerable illumination system, with different voltages applied to the LCPG devices to change an angle of the combined beam of light.

As shown in FIG. 2, the drive voltage control module 126 is supplying a drive voltage to each LCPG device to result in a combined beam of light output at a first angle (e.g., zero degrees). FIG. 3 is a block diagram illustrating the solid state steerable illumination system 100, with different voltages applied to the LCPG devices to change an angle of the combined beam of light.

For example, in FIG. 3 the drive voltage control module 126 is supplying different drive voltages to each LCPG device as compared to FIG. 2, which causes the light coming out of each LCPG device to have a different angle compared to FIG. 2. The resulting combined beam of light output from the beam combiner 116 then has a different illumination angle compared to FIG. 2.

A desired angle of illumination may be determined by the drive voltage control module 126 based on, e.g., a steering angle of the vehicle 10, a target object for illumination as detected by the front vehicle sensor 26, etc. The drive voltage control module 126 may determine what drive voltages to apply to the LCPG devices based on, for example, a look up table, a stored mapping of drive voltages to illumination angles, a function which relates drive voltages to illumination angles, etc.

Each LCPG device may be configured to change an angle of the output light at different intervals, which may be based on a number of layers of the LCPG device. For example, each LCPG device may be configured to change an angle of the light by plus or minus one degree, plus or minus five degrees, plus or minus fifteen degrees, etc., and multiple layers may be combined to create larger steering angles. in addition, some layers may be arranged with a horizontal grating orientation and other with a vertical grating orientation, to allow light to be steered in vertical and horizontal directions.

The drive voltage control module 126 may be configured to provide drive signals to the red light source 102, the green light source 104 and the blue light source 106. The drive voltage control module 126 may adjust levels of the drive signals to control an intensity of the combined output beam of light, to adjust a color of the combined output beam of light, etc.

As shown in FIGS. 2 and 3, protection optics 118 may be positioned at an output of the beam combiner 116. The projection optics 118 may include any suitable optical elements or devices for modifying an optical property of the combined output beam of light.

For example, the projection optics 118 may include a diffuser, which is configured to mix the light from each light source. The projection optics 118 may include a shape silhouette outline generator, which is configured to selectively apply different silhouette outlines to the combined beam of light (e.g., by forming the shape of a turn arrow to be projected on the road to let a driver know where to turn).

The LCPG units may be connected to a computer driven voltage driver which deflects the beam to a desired angle according to the drive voltages sent to the LCPG device. The input to the voltage driver e.g., the desired angular location, may be derived from a perception or viewing based camera system of the vehicle which can provide real time feed back to the LCPG system, to adapt the scene illumination at a frame-to-frame rate.

Each of the synchronized LCPG units may be calibrated to steer to the same angle at any given time. The fundamental steering angle of any given LCPG unit is a function of the diffraction angle of the diffraction grating. This in turn is a function of the wavelength of light. Therefore, each LCPG unit of a particular wavelength may have a specific grating spacing that will allow it to steer to a specific angle per the grating equation: $d*\sin(\theta) = n*\lambda$, where d is a grating spacing, $\theta$ is a diffracted angle, n is a grating order (e.g., either 1 or −1 in some cases), and $\lambda$ is a wavelength of light.

Each light source may have an independent "driver," such as a voltage controlled current source that controls the intensity of the light source. By modulating the current source, the light intensity can be adjusted, which creates different perceived colors and intensities.

Additional LCPG stacked units can be added to either expand the range of the horizontal steering, or to create both vertical and horizontal steering directions (e.g., where one LCPG unit is stacked with an orthogonal LCPG unit). Any suitable number of LCPG units may be stacked, although some applications may limit a total number of LCPG stages based on overall light transmission efficiency, cost and size.

The steering angle per individual single LCPG unit is determined by the grating spacing value (d), which is set during the design/manufacturing phase. Additional scan angles can be generated by adding more LCPG stages to the initial unitary stack of the LCPG in multiple of 2, assuming a same grating spacing is used. Alternate designs with different grating spacings can be used, but this may provide performance that has non uniform steering and manufacturing complexity.

Figure 4:
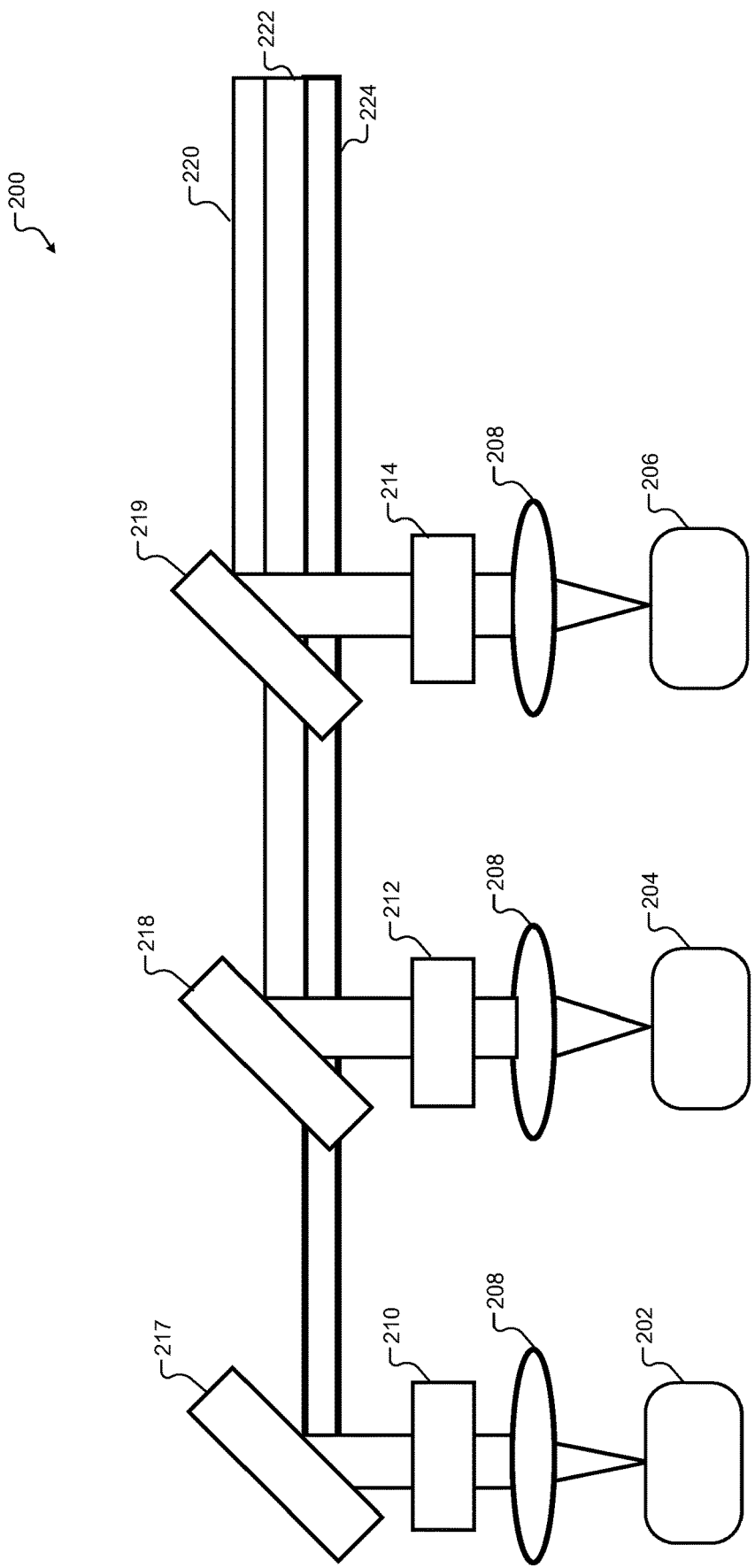
FIG. 4 is a block diagram of another example embodiment of a solid state steerable illumination system, without projection optics illustrated.

FIG. 4 is a block diagram of another example embodiment of a solid state steerable illumination system 200. No projection optics are illustrated in FIG. 4, although they may optionally be used in various implementations. The solid state steerable illumination system 200 is similar to the solid state steerable illumination system 100 of FIGS. 2 and 3, but with a different arrangement of the beam combining elements.

As shown in FIG. 4, a first wavelength light source 202 is configured to shine light through a collimation lens 208 and a first LCPG device 210, onto a first beam combiner element 217 (which may be a mirror, etc.). A second wavelength light source 204 is configured to shine light through a collimation lens 208 and a second LCPG device 212, onto a second beam combiner element 218.

A third wavelength light source 206 is configured to shine light through a collimation lens 208 and a third LCPG device 210, onto a third beam combiner element 219. The beam combiner elements are arranged in a line, at corresponding angles, to generate a combined output beam of light where a first wavelength light beam 224, a second wavelength light beam 222 and a third wavelength light beam 220 are combined to form an output of the solid state steerable illumination system 200.

FIG. 4 includes light sources of different wavelengths, which may be red, blue and green light wavelengths, or any other suitable wavelength values. A drive voltage control module may be configured to supply drive voltage to the first LCPG device 210, the second LCPG device 212, and the third LCPG device 214, to steer an angle of the combined output beam of light.

For example, the three beams from the three light sources may be combined by individual optical components made of, e.g., a mirror or preferential reflector. Two transmissive and reflective beam combiners may preferentially transmit at least one wavelength of light while reflecting a different wavelength of light. The output can be coaxial, and is shown as non-coaxial in FIG. 4 just to for illustration purposes.

Figure 5:
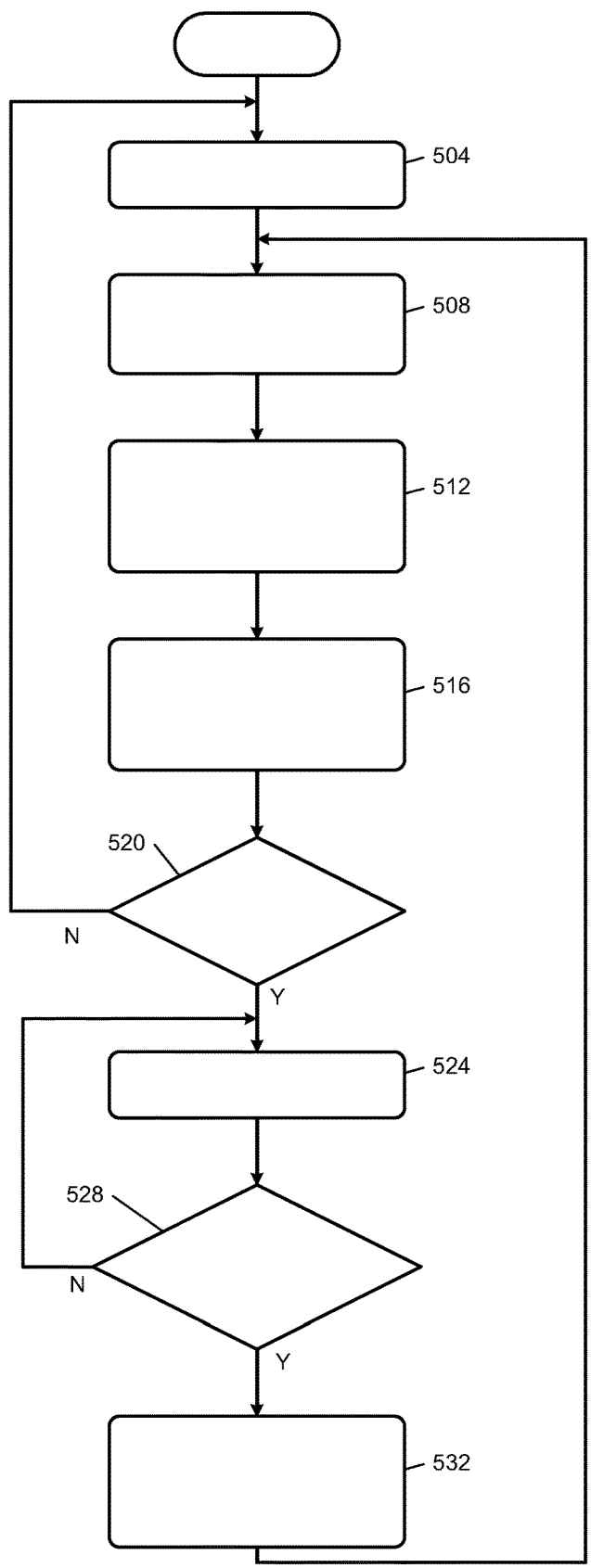
FIG. 5 is a flowchart depicting an example process for controlling a solid state steerable illumination system of a vehicle.

FIG. 5 is a flowchart depicting an example process for controlling a solid state steerable illumination system of a vehicle. The process illustrated in FIG. 5 may be performed by, for example, the vehicle control module 20 of FIG. 1.

At 504, the process begins by determining a desired angular location of illumination. For example, the vehicle control module may determine a direction that the vehicle is currently turning, the vehicle control module may identify a target object in the environment ahead of the vehicle to be illuminated, etc.

At 508, the vehicle control module is configured to translate the angular location to drive voltages for each of the LCPG devices. For example, a look up table, a drive voltage versus light angle mapping, a function of light angle based on drive voltage, etc., may be used in order to determine what drive voltages should be applied to the LCPG devices in order to generate a beam of light having a desired angular direction of output.

The vehicle control module is configured to translate a desired color and intensity into individual light source drive modulation signals, at 512. For example, if a white light output is desired, the vehicle control module may determine to apply equal drive voltages to each of a red light source, a blue light source, and a green light source. If a specific color is desired, the vehicle control module may be configured to apply a larger voltage to drive a light source having the desired light color, relative to light source of other color wavelengths. If a brighter illumination is desired, the vehicle control module may apply a larger drive voltage to each light source.

At 516, the vehicle control module is configured to generate illumination output using the LCPG drive voltages and the light source drive modulation signals. For example, light source drive modulation signals may be supplied to the light sources to generate a desired color and intensity of light, while the LCPG drive voltages are supplied to the LCPG devices to steer the direction of light towards a desired angular location. The LCPG drive voltages and light source drive modulation signals may be supplied by the same or different circuits.

The vehicle control module is configured to determine whether target object tracking is enabled at 520. For example, in some embodiments the vehicle control module may be configured to steer the illumination toward identified target objects, such as a road sign identified ahead of the vehicle by a front vehicle sensor. In other embodiments, the vehicle control module may steer the light beam based on other criteria, such as a direction of turning of the vehicle.

If the vehicle control module determines at 520 that target object tracking is not enabled, the process returns to 504 to determine a next desired angular location of illumination. If the vehicle control module determines at 520 that target object tracking is enabled, control proceeds to 524 to determine a location of a target object (such as via detection by a front vehicle object sensor).

At 528, the vehicle control module is configured to determine whether a location of the target object is different than an illumination angular location. If not, control returns to 524 to continue tracking the location of the object relative to the illumination location.

If the target object location is different than the illumination angular location at 528, control proceeds to 532 to determine an updated angular location of illumination based on the target object location. Control then returns to 508 to translate the updated angular location into updated drive voltages for the LCPG devices.

Some example embodiments may include light sources with relatively narrow spectral bandwidths, such as LEDs, VCSELS, Lasers, SLEDS, etc.

Polarization filters may be used to prepare an incident light source for each LCPG to a correct initial polarization state. The polarization filters are optional, and may depend upon the light source used (e.g., lasers may not need a polarization filter).

Multiple light sources may be combined to generate a color intensity suitable for a given scenario condition. A feedback mechanism via external sensors (e.g., object sensors, vehicle cameras, etc.) may be used as input to determine where in the scene to illuminate (e.g., what portion of a forward field of view of a vehicle), what power level to apply, what beam shape to form, etc. Projection optics may be used to project a desired beam shape out of an illumination lamp (such as a vehicle head lamp). In some embodiments, a diffuser may be used to homogenize the optical beam spatially and angularly.

Control electronics may be configured to drive the light sources with specified modulation frequency and intensity, and may be configured to drive the LCPG devices to desired angular positions of output illumination.

In some example embodiments, at least two light sources (e.g., LEDs, Lasers, VCSELs or SLEDs) may be combined to generate light of a particular color. An optical beam combining element may receive light beams at orthogonal angles to one another, and combine the reflected and transmitted beams into a single collinear output beam.

Example systems may include a separate LCPG device for each light source, which is designed to correspond to dominate wavelength of the light source. Each LCPG device may include one or more stages, to allow for 2N number of steerable angles where N is the number of LCPG stages used.

The output beam may be shaped via a static aperture shape, or a dynamic spatial light modulator (which may be transmissive or reflective to alternate the beam shape to adapt it to desired illumination scene features). A feedback mechanism via sensors (e.g., cameras, lidar, radar, or a combination thereof), may provide a target location of where illumination is desired to be directed. The feedback may provide intensity values for the illumination, for a given scenario. In some example embodiments, input from the vehicle planning system, or input from the navigation application, may be used to generate pattern illumination on the road to assist the driver.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A solid state steerable illumination system for a vehicle, the system comprising:
    a first light source configured to generate light having a first wavelength;
    a second light source configured to generate light having a second wavelength;
    a third light source configured to generate light having a third wavelength, wherein the first wavelength, the second wavelength and the third wavelength are different;
    a first liquid crystal polarized grating (LCPG) device arranged to receive light from the first light source;
    a second liquid crystal polarized grating (LCPG) device arranged to receive light from the second light source;
    a third liquid crystal polarized grating (LCPG) device arranged to receive light from the third light source;
    a beam combiner configured to receive light output from the first LCPG device, light output from the second LCPG device, and light output from the third LCPG device, to define a combined beam of light; and
    a vehicle control module configured to supply drive voltages to the first light source, the second light source, the third light source, the first LCPG device, the second LCPG device and the third LCPG device to generate the combined beam of light, wherein an output orientation angle of the combined beam of light is variable according to the drive voltages applied to the first LCPG device, the second LCPG device and the third LCPG device.

2. The system of claim 1, wherein the vehicle control module is configured to:
obtain a target angular illumination location;
determine drive voltages for the first LCPG device, the second LCPG device and the third LCPG device, corresponding to the target angular illumination location; and
supply the determined drive voltages to the first LCPG device, the second LCPG device and the third LCPG device to orient the combined beam of light towards the target angular illumination location.

3. The system of claim 2, wherein the target angular illumination location is a first target angular illumination location, and the vehicle control module is configured to:
obtain a second target angular illumination location;
determine updated drive voltages for the first LCPG device, the second LCPG device and the third LCPG device, corresponding to the second target angular illumination location; and
supply the updated drive voltages to the first LCPG device, the second LCPG device and the third LCPG device to steer the combined beam of light towards the second target angular illumination location.

4. The system of claim 3, wherein suppling the updated drive voltages to the first LCPG device, the second LCPG device and the third LCPG device to steer the combined beam of light towards the second target angular illumination location includes changing an angular direction of the combined beam of light without mechanically moving the first light source, the second light source and the third light source, and without mechanically moving any optical device.

5. The system of claim 1, wherein the vehicle control module is configured to:
identify a target object location using at least one front vehicle sensor of the vehicle;
obtain a target angular illumination location according to the target object location;
determine drive voltages for the first LCPG device, the second LCPG device and the third LCPG device, corresponding to the target angular illumination location; and
supply the determined drive voltages to the first LCPG device, the second LCPG device and the third LCPG device to orient the combined beam of light towards the target object location.

6. The system of claim 1, further comprising a projection optic configured to modify an optical property of the combined beam of light, wherein the projection optic includes at least one of a diffuser and a shape silhouette outline.

7. The system of claim 1, further comprising:
a first collimation lens positioned between the first light source and the first LCPG device;
a second collimation lens positioned between the second light source and the second LCPG device; and
a third collimation lens positioned between the third light source and the third LCPG device.

8. The system of claim 1, wherein:
the first wavelength corresponds to a visual red light color;
the first wavelength corresponds to a visual blue light color; and
the first wavelength corresponds to a visual green light color.

9. The system of claim 1, further comprising a vehicle headlamp, wherein the combined beam of light is transmitted as an output of the vehicle headlamp.

10. The system of claim 1, further comprising a vehicle interior light, a vehicle dashboard light or a vehicle exterior light, wherein the combined beam of light is transmitted as an output of the vehicle interior light, the vehicle dashboard light or the vehicle exterior light.

11. The system of claim 1, wherein the first LCPG device includes at least two passive polarized grating layers each configured to modify an angular orientation of received light according to a level of voltage applied to the polarized grating layer.

12. The system of claim 1, wherein the vehicle control module is configured to:
obtain a target light color value and a target light illumination value;
determine light source drive voltages corresponding to the target light color value and the target light illumination value; and
supply the determined light source drive voltages to the first light source, the second light source and the third light source, to generate the combined beam of light having the target light color value and the target light illumination value.

13. A method of controlling solid state steerable illumination for a vehicle, the method comprising:
supplying light source drive voltages to a first light source to generate light having a first wavelength, to a second light source configured to generate light having a second wavelength, and to a third light source configured to generate light having a third wavelength, wherein the first wavelength, the second wavelength and the third wavelength are different; and
supplying liquid crystal polarized grating (LCPG) drive voltages to a first LCPG device arranged to receive light from the first light source, a second liquid crystal polarized grating (LCPG) device arranged to receive light from the second light source, and a third liquid crystal polarized grating (LCPG) device arranged to receive light from the third light source,
wherein a beam combiner is configured to receive light output from the first LCPG device, light output from the second LCPG device, and light output from the third LCPG device, to define a combined beam of light.

14. The method of claim 13, further comprising:
obtaining a target angular illumination location;
determining drive voltages for the first LCPG device, the second LCPG device and the third LCPG device, corresponding to the target angular illumination location; and
supplying the determined drive voltages to the first LCPG device, the second LCPG device and the third LCPG device to orient the combined beam of light towards the target angular illumination location.

15. The method of claim 14, wherein the target angular illumination location is a first target angular illumination location, and method further comprises:
obtaining a second target angular illumination location;
determining updated drive voltages for the first LCPG device, the second LCPG device and the third LCPG device, corresponding to the second target angular illumination location; and
supplying the updated drive voltages to the first LCPG device, the second LCPG device and the third LCPG device to steer the combined beam of light towards the second target angular illumination location.

16. The method of claim 15, wherein suppling the updated drive voltages to the first LCPG device, the second LCPG device and the third LCPG device to steer the combined beam of light towards the second target angular illumination location includes changing an angular direction of the combined beam of light without mechanically moving the first light source, the second light source and the third light source, and without mechanically moving any optical device.

17. The method of claim 13, further comprising:
identifying a target object location using at least one front vehicle sensor of the vehicle;
obtaining a target angular illumination location according to the target object location;
determining drive voltages for the first LCPG device, the second LCPG device and the third LCPG device, corresponding to the target angular illumination location; and
supplying the determined drive voltages to the first LCPG device, the second LCPG device and the third LCPG device to orient the combined beam of light towards the target object location.

18. The method of claim 13, wherein a projection optic is configured to modify an optical property of the combined beam of light, wherein the projection optic includes at least one of a diffuser and a shape silhouette outline.

19. The method of claim 13, wherein:
a first collimation lens is positioned between the first light source and the first LCPG device;
a second collimation lens is positioned between the second light source and the second LCPG device; and
a third collimation lens is positioned between the third light source and the third LCPG device.

* * * * *